United States Patent
Wagner et al.

(10) Patent No.: US 9,446,635 B2
(45) Date of Patent: *Sep. 20, 2016

(54) UNIVERSAL TIRE PRESSURE SENSOR

(71) Applicant: Huf Huelsbeck & Fuerst GmbH & Co. KG, Velbert (DE)

(72) Inventors: Markus Wagner, Ludwigsburg (DE); Benjamin Mueller, Karlsruhe (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/539,159

(22) Filed: Nov. 12, 2014

(65) Prior Publication Data

US 2016/0039254 A1 Feb. 11, 2016

(30) Foreign Application Priority Data

Aug. 8, 2014 (DE) .......................... 10 2014 111 326
Aug. 21, 2014 (DE) .......................... 10 2014 111 968

(51) Int. Cl.
*B60C 23/00* (2006.01)
*B60C 23/02* (2006.01)
*B60C 23/04* (2006.01)

(52) U.S. Cl.
CPC ........... *B60C 23/02* (2013.01); *B60C 23/0454* (2013.01); *B60C 23/0471* (2013.01)

(58) Field of Classification Search
CPC .............. B60C 23/04; B60C 23/0471; B60C 23/0774; B60C 23/0479; B60C 23/0422; B60C 23/0433; B60C 23/00; B60C 23/0408
USPC .............. 340/442, 445, 447, 426.33; 73/146, 73/146.2, 146.3, 146.5; 116/34, 34 R
See application file for complete search history.

(56) References Cited

U.S. PATENT DOCUMENTS 4,669,046 A * 5/1987 Kubo .................. B60T 8/17616
303/122.07
6,505,507 B1 * 1/2003 Imao ................... B60C 23/0408
73/146.5

(Continued)

FOREIGN PATENT DOCUMENTS

EP 1 623 849 A2 2/2006
EP 2 280 837 B1 12/2011

(Continued)

OTHER PUBLICATIONS

Extended European Search Report of European Application No. 15176990.8 dated Dec. 16, 2015, 7 pages.

(Continued)

*Primary Examiner* — Daryl Pope
(74) *Attorney, Agent, or Firm* — Fay Sharpe LLP

(57) ABSTRACT

A tire pressure sensor for motor vehicles, includes a housing, which accommodates an integrated circuit (sensor IC), having a microcontroller and a pressure sensor. The microcontroller transfers pressure measurement values to a separate receiver device by wireless communication. The sensor IC has an internal memory, in which executable instructions and data can be stored, which, when executed, result in the acquisition and transference of the pressure measurement data. A power supply is disposed in the housing, and coupled to the sensor IC which is coupled to an auxiliary memory module disposed in the housing. Numerous different data packets, with respective instructions or data, are stored in the memory module. The auxiliary memory module can be activated via the microcontroller, in order to copy a selected data packet into the internal memory. The auxiliary memory module is coupled to the microcontroller of the sensor IC by a serial data interface.

10 Claims, 1 Drawing Sheet

(56) References Cited

U.S. PATENT DOCUMENTS

| | | | |
|---|---|---|---|
| 8,659,412 B2* | 2/2014 | Deniau | B60C 23/0408 340/10.4 |
| 8,692,661 B2* | 4/2014 | Deniau | B60C 23/0408 116/34 R |
| 2002/0075145 A1 | 6/2002 | Hardman et al. | |
| 2005/0104722 A1 | 5/2005 | Tang et al. | |
| 2013/0226403 A1 | 8/2013 | Zhang | |
| 2014/0172342 A1 | 6/2014 | Yu et al. | |

FOREIGN PATENT DOCUMENTS

| | | |
|---|---|---|
| WO | WO 2012/162172 A1 | 11/2012 |
| WO | WO 2013/022435 A1 | 2/2013 |

OTHER PUBLICATIONS

Extended European Search Report of European Application No. 15176998.1 dated Jan. 7, 2016, 10 pages.

* cited by examiner

UNIVERSAL TIRE PRESSURE SENSOR

BACKGROUND

The invention relates to a universal tire pressure sensor. In particular, the invention relates to a tire pressure sensor that can be configured to communicate in a simple manner with numerous vehicle-side tire pressure monitoring systems (TPMS).

Automatic tire pressure monitoring systems are known in the prior art. The use of such systems helps drivers thereby to always drive with the correct tire filling pressure, because the driver is informed by a corresponding warning message in the passenger compartment when there is a deviation from the correct pressure. The correct tire pressure has an effect on the safety, optimal driving dynamics, and also on driving comfort.

So-called direct tire pressure monitoring systems function in a particularly precise manner. Tire pressure sensors detect the tire pressure at each tire, and if applicable, other tire data, e.g. temperature. These data are transmitted, together with an identifier of the tire pressure sensor, to a control device in the vehicle, by means of a radio signal. By way of example, a data transmission of this type can occur in the range of 434 MHz or 315 MHz (high frequency communication, or HF-communication).

A communication from the vehicle-side control unit with the tire pressure sensors occurs with so-called triggered systems after transmission of a query signal by means of the control device; this request can be made in the low frequency range (e.g. 125 kHz). Due to the low frequency, the transmission range of a low frequency signal, such as one in the range of 125 kHz, is short. With a suitable dimensioning, a control device-side trigger transmitter can be configured such that the transmission range is only a few meters, such that only the tires on the actual vehicle are addressed. There are systems having numerous trigger transmitters as well as those having a single trigger transmitter.

The tire pressure sensor responds to the trigger, as specified above, in a wireless manner, e.g. with a data protocol in the high frequency range.

Systems that function entirely without triggers, and which transmit data from the tire sensors as a function of condition changes, are also known and typical.

A method and system for a wireless tire pressure monitoring is known, for example, from EP 2 280 837 B1.

Another monitoring method is described in WO 2013/022435.

US 2005/0104722 A1 describes a so-called universal tire pressure sensor in accordance with the preamble of claim 1.

Tire pressure sensors contain some kind of power source or energy storage unit, such as a battery or a Piezo-generator, for example. Moreover, a pressure sensor, and optionally a temperature sensor, are provided, which are coupled to a microcontroller. The typical tire pressure sensors have a high frequency transmitter with an antenna associated therewith, and a low frequency receiver, having a coil associated therewith. It is also possible, however, to implement systems having only high frequency reception/transmission technology. Optionally, acceleration sensors and oscillating crystals are provided in the sensor assembly. Many of the components can be integrated in a standardized integrated circuit, a so-called sensor IC.

Despite the uniformity of the components in a tire pressure sensor, the sensors must be adjusted to the vehicle systems with respect to the transmission of acquired data and other characteristics. By way of example, different vehicle manufacturers have different requirements regarding carrier frequency, modulation of the signal, data formats or encoding technologies for the signals.

Recently, it has been attempted to provide numerous vehicles with standardized sensors. For systems of this type, the term "universal sensor" (universal tire pressure sensor) has been established. As a rule, a distinction is made thereby between programmable universal sensors, multi-protocol universal sensors, and configurable universal sensors.

A programmable universal sensor receives a complete, vehicle-specific programming by means of a comprehensive programming, usually transmitted in a wireless manner, which can require a few tens of seconds to as much as a few minutes. The time required for this programming and the susceptibility to transmission error has rendered a system of this type less acceptable, considering the large number of tires to be mounted in a garage.

The so-called multi-protocol universal sensors, in contrast to programmable universal sensors, are already programmed, such that the comprehensive programming procedure is omitted. The specific transmission protocols and the other sensor parameters for different vehicles, however, cannot all be contained in the memory of a tire pressure sensor. As a result, each sensor is applicable for a sub-group of vehicles, wherein the sensor in these various configurations transmits its acquired data in succession. The control device comprehends only a portion of the transmitted data, and the rest is discarded. As a result, only a fraction of the data transmitted by the sensor actually also serves the message transmission, such that a strongly increased power consumption results, and furthermore, disruptions in the communication environment may also be caused due to the messages not being used.

A further development concerns a so-called configurable universal sensor, which is programmed from the start with numerous transmission protocols and parameters, but still requires some critical data before it can establish communication with the vehicle-side device. Thus, an appropriate configuration is selected from a set of stored configurations, according to which the operation can be subsequently executed. After successful configuration, the universal sensor, which has been configured once, subsequently transmits only the appropriate protocol. The data required for the configuration comprise only a small amount of data, the transmitted data quantity is thus less, by orders of magnitude, than with a complete programming. The sensor is only informed as to which of its stored configurations it is to make use of for communication.

All of the systems specified above have disadvantages. On the one hand, with a system for a tire pressure sensor isolated from the rest of the environment, the lowest possible power consumption is a factor, and on the other hand, a quick programming with a comprehensive coverage of vehicles by means of a single sensor model is of significance. Ideally, a truly universal sensor could be created, which also exhibits a low power consumption.

BRIEF DESCRIPTION

This objective is achieved by means of a universal sensor having the features of claim 1, and a method having the features of claim 8.

According to the invention, the universal sensor has an installed, auxiliary memory, which is connected to the microcontroller of the sensor IC.

When referring to a sensor IC in this document, this concerns an integrated circuit, having a microcontroller with pressure measurement functions and, if applicable, communication interfaces. Other sensors can also be integrated in the Sensor IC, in particular temperature sensors or acceleration sensors. Receiver coils or transmission antennas can likewise be integrated therein, or designed such that they are separate from the sensor IC. A power supply can be designed separately from the sensor IC, in the form of a battery or a generator, e.g. a Piezo-generator.

The auxiliary memory can be any type of permanent memory, e.g. a flash memory (by way of example, an SPI [Serial Peripheral Interface] flash memory, e.g. from the company Micron).

Although the auxiliary memory is accommodated in the sensor housing in a fixed manner and remains there permanently, it is only provided, however, for the initial storing of numerous different manufacturer configurations. The sensor contains all of the data in this auxiliary memory that is required for the data acquisition and transmission in accordance with the specifications for different vehicle manufacturers. This may concern individual parameter sets, and this can also concern complete programs or subprograms, as well as any other type of electronically storable data.

In its initial state, the sensor is capable of accessing the auxiliary memory, which is provided in addition to the internal memory for the sensor IC. The sensor IC is also provided with a basic functionality, e.g. in the form of a boot loader, which can receive the selection identifier from a wireless communication device, and which processes the communication copying with the auxiliary memory.

Data is transferred to the sensors during the installation in the vehicle, enabling a selection of a configuration set from the auxiliary memory. By way of example, a numerical identifier or some other type of identifier set is transmitted. This can occur in the conventional manner, in particular with a wireless system, or a temporary wiring. As wireless systems, so-called RDKS diagnosis devices are available and known in the market. These can transmit various commands in the low frequency range. The data transference speed is rather low thereby, but only a short command sequence must be transmitted, similar to that with a configurable tire pressure sensor described above.

The connection of the auxiliary memory to the sensor IC is designed as a serial interface in accordance with the invention.

This design enables an extremely cost-effective and simple design. It is possible to use a standardized sensor IC, or a sensor IC that has been prefabricated in the market, as long as this allows for an activation of the serial interface. Frequently, the microcontrollers of the sensor ICs that are available in the market have an open contact point, which can be used as a serial interface with the corresponding programming. By way of example, sensor ICs that are available on the market from the company "freescale" (e.g. FXTH87), can be used.

With this design, it is not necessary to establish a complicated interface or even a bus system between the sensor IC and the auxiliary memory. Although the data transference between the sensor IC and the auxiliary memory is comparatively slow with a serial communication, the access to the actual memory occurs only once, specifically for the copying procedure. For this, the slow data transference is insignificant, because the transferred data quantity is still transferred significantly more quickly than with a programming by means of a wireless programming device. Furthermore, the copying process runs entirely in the sensor, such that a mechanic can attend to other duties after triggering the configuration process, while the sensor programs the memory internally, and subsequently deactivates the auxiliary memory.

The auxiliary memory is not used as an expansion memory in terms of its function, for which the access via a serial interface would be too slow. Because the auxiliary memory is only a data container, which is no longer needed after the desired data has been provided to the sensor IC during the configuration (or is first needed again after a fairly long time), the serial transference of the data volume is acceptable.

It is particularly advantageous if this interface is implemented by means of a single electrical line.

The serial transference by bits can be implemented with a minimal structural expenditure; aside from supply lines (power supply), a single data line is sufficient. The demands on the memory area in the auxiliary memory are taken care of via this data line, and the required memory contents are transferred to the sensor IC for storage in the internal memory of the sensor IC. Even in this design, the transference is more stable and faster, by orders of magnitude, than a complete wireless programming of the internal memory.

In a further development of the invention, the auxiliary memory provided according to the invention can be deactivated by the control for the sensor IC, or its power consumption can be reduced, i.e. it can be disconnected from the power supply, or its power consumption can be reduced.

It is also possible thereby, according to the invention, to modify previously configured sensors in terms of their configuration, by way of example, in the case of a configuration error, or when installed in a different vehicle.

The operation of an auxiliary memory of this type is only intended as long as the sensor is not yet configured to the target system. As a substantial difference to a memory expansion, it is provided that the auxiliary memory can be shut off after the initial first programming. This is thus not a memory expansion, but rather a memory module that can be temporarily activated. It is provided according to the invention that the data required by the auxiliary memory for configuration in the internal memory of the integrated circuit (IC) of the sensor is permanently copied. The internal memory of the sensor need only be large enough that it can definitely store the data and programs for each of the possible configurations (but must not be large enough to record different configurations simultaneously). As a result, the power consumption is optimized in the normal operation of the sensor. The auxiliary memory can be designed to be substantially larger in this respect, because it is only supplied with power for a short time, specifically during the configuration of the sensor. After a successful copying into the internal memory of the sensor IC, the auxiliary memory is shut off, wherein the shutting off is at least temporary, or is permanent.

The sensor created in this manner is an actual universal sensor, because it can be used in any vehicle model having a single sensor. The limitation of the memory is substantially eliminated, and accordingly, the system requires no more energy during operation than a conventional tire pressure sensor, because the increased energy consumption is only required during the configuration, and the auxiliary memory can be shut off after the data has been transferred. The auxiliary memory can accommodate transmission parameters as well as complete applications thereby. The auxiliary memory can be designed as a separate component from the sensor IC, although this need not be the case, such that it is installed separately. This simplifies the adjustment of the production of new sensors for modified or new vehicle systems.

The significance here is that an auxiliary memory, that can be deactivated with respect to the power/voltage supply, is designed such that it contains the necessary data and can be temporarily coupled to the sensor IC, and that this memory is permanently accommodated in the sensor housing. The auxiliary memory thus actually remains as a component of the sensor, even though it is not activated during the substantial time period of the lifetime of the sensor. The substantial advantage of this universal sensor is achieved, however, in that the sensor already contains all of the adjustment capabilities, and only requires a configuration regarding the desired target system. The actual programming of the sensor IC runs in the sensor itself, between the auxiliary memory and the sensor IC, and only requires the trigger signal for programming, with the corresponding instructions concerning which program is to be copied from the auxiliary memory into the sensor IC. Because the auxiliary memory is connected to the sensor IC by wiring, a copying procedure of this type is completed in an extremely short time period, which is faster than programming carried out by means of a wireless programming device by orders of magnitude. This system also surpasses programming using contact pins, because manual manipulation in terms of the coupling to a programming device is not needed at all for the sensor. A mechanic installing the respective tire pressure sensor transmits only a programming signal to the sensor, this is acknowledged, and the copying procedure runs in the sensor internally. After a successful copying, a stop signal can be issued, and subsequently the sensor can disconnect the power supply to the auxiliary memory on its own.

It is preferred thereby that the microcontroller then switches to the energy saving mode for the auxiliary memory, after a selected data packet has been copied into the internal memory from the auxiliary memory. The power supply to the auxiliary memory can, however, alternatively be disconnected in accordance with an external programming signal. The concept according to the invention significantly reduces the time required for the configuration. The entire time required for the configuration is less than a few seconds, and the transfer of the other data via the internal conductor paths enables a fast transference that is free of error.

Regarding the permanence of the disconnection of a power supply to the auxiliary memory, numerous designs are possible. By way of example, the sensor IC can actually only temporarily activate the auxiliary memory, for as long as a programming process occurs. The sensor IC can, however, also maintain this power supply such that it can be reactivated, wherein the sensor would then also be able to be reprogrammed after the initial configuration, such that it could then acquire a different configuration formula from the auxiliary memory. For this, the auxiliary memory would be reactivated by the sensor IC after a corresponding signal has been received, thus supplied with power, and another program or data range is then copied into the sensor IC from the auxiliary memory.

The data connection between the sensor IC and the auxiliary memory can be encoded for the copying. By way of example, the data can already be stored in the auxiliary memory in an encoded form for this, and the sensor IC contains the programming that enables the encoding to be decoded during the copying, such that decoded data is then stored in the sensor IC.

An encoding of this type makes unauthorized copying of a tire pressure sensor, and manipulation of the programming, more difficult.

The data in the auxiliary memory can also be encoded on the respective concrete sensor, such that a different key is generated for each individual sensor. In this case, the auxiliary memory can only be used with the associated, individual sensor IC. This further increases the security in a concept of this type, pertaining to security.

Fundamentally, it can also be provided that data can also be written into the auxiliary memory by means of the sensor IC. This means that a universal sensor of the type according to the invention can then be supplied with new data for the auxiliary memory in a then, if applicable, longer running programming process. This is useful in the case of up-dates, or for configurations to other vehicles, for example. Because a reprogramming of this type does not, however, take place directly during the installation, but rather, is carried out by the manufacturer, this procedure is not subjected to time restrictions as much, and further increases the usefulness of a universal sensor of this type.

It is a preferred design of the sensor if the power supply to the auxiliary memory can be entirely deactivated, or reduced.

A significant amount of energy is already saved if, in accordance with the invention, the access to the auxiliary memory module is prevented, but an actual shutting off thereof significantly optimizes the energy requirements for the entire apparatus.

BRIEF DESCRIPTION OF THE DRAWINGS

The invention shall now be explained in greater detail based on the attached drawings.

DETAILED DESCRIPTION

Figure 1:
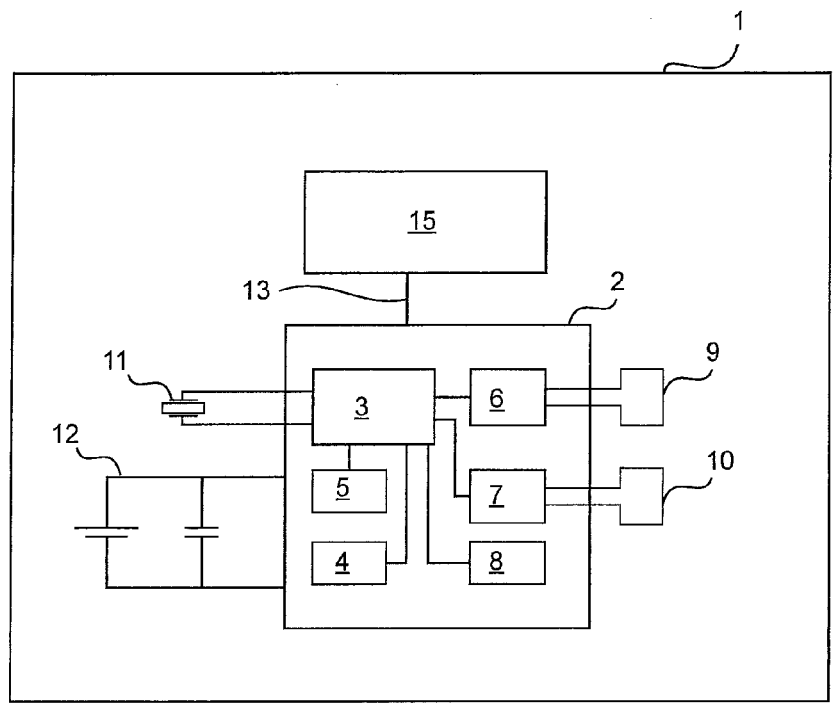
FIG. 1 shows, schematically, the construction of a universal sensor according to the invention.

A sensor is shown in a schematic depiction in FIG. 1. A housing 1 comprises all of the components of the sensor. In certain embodiments, by way of example, a valve stem of a tire pressure valve can extend into the housing 1, or it can be coupled to the housing 1. In other sensors, the housing 1 is disposed at other locations in the tire, independently of the valve stem, e.g. in the tread.

A sensor IC 2 is disposed in the housing 1. The sensor IC contains an integrated circuit having a microcontroller 3. As sensors, a pressure sensor 4, a temperature sensor 5 and an acceleration sensor 8 are provided in the sensor IC 2 in this embodiment example. A high frequency (HF) transmitter unit 6 integrated in the sensor IC 2 is coupled to a separate HF antenna 9. A low frequency (LF) receiver unit 7 disposed on the sensor IC 2 is coupled to a separate LF coil 10.

The sensor IC 2 is supplied with power by means of a power source (e.g. a battery with a storage capacitor or a Piezo-generator), which is referred to as a whole as a power supply 12. An oscillating crystal 11 is incorporated as the impulse generator for the HF communication. More or fewer sensor devices can be formed in other embodiment examples. The oscillating crystal 11 can also be integrated on the sensor IC. Lastly, it is also not absolutely necessary to incorporate transmitter and receiver units for different frequency ranges, if a uniform protocol is used as the communication protocol for the reception and the transmission of data. For this, other high frequency protocols, e.g. Bluetooth communication, can also be considered.

In the shown embodiment example, an auxiliary memory 15 is formed separately from the sensor IC 2. The auxiliary memory 15 is connected to the sensor IC via a single data line 13, such that a serial data communication is possible between the sensor IC 2, in particular the microcontroller 3, and the auxiliary memory 15. In addition to the data line 13, supply lines (power) and wake-up lines (not shown) can lead to the auxiliary memory.

The sensor IC 2 itself has an internal memory, which is significantly smaller than the auxiliary memory 15. In the embodiment example, the sensor IC 2 is provided, for example, with an 8 kB internal, permanent memory, which is combined with the microcontroller 3 in the depicted example.

The internal memory of the sensor IC 2 has a basic functionality in the design of the stored instructions, referred to in the following as a so-called boot loader. The boot loader coordinates, initially, the communication of the sensor with the outside world. In the shown example, an LF reception by means of the LF coil 10 and the LF receiver unit 7 is possible under the control of the boot loader in the microcontroller 3. A data set identifier is transmitted via the LF interface, by means of an external control device (RDKS diagnosis device, not shown), to the microcontroller, and the microcontroller 3 accesses the auxiliary memory 15 via the serial connection 13, and calls up a memory area corresponding to the transmitted identifier. The corresponding memory area is then copied from the auxiliary memory 15 into the internal memory of the sensor IC 2, via the serial connection 13, under the control of the boot loader, and stored permanently therein. After a successful copying procedure, the sensor IC 2 then has both the boot loader as well as an executable application in the internal memory, which enables permanent operation of the sensor 1 in accordance with the programmed configuration.

Figure 2:
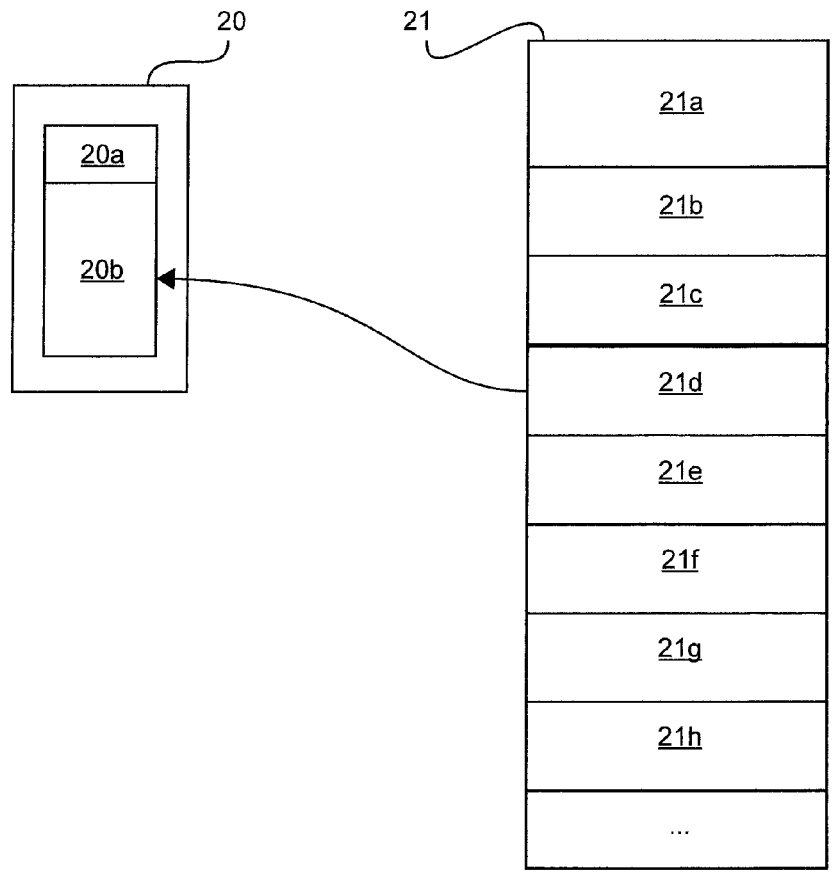
FIG. 2 shows, schematically, the memory distribution for an internal memory and an auxiliary memory in a tire pressure sensor according to the invention.

FIG. 2 illustrates the procedure and the memory distribution in a schematic manner. The distribution of the internal memory of the sensor IC 2 is provided with the reference numeral 20. The distribution 21 of the auxiliary memory reflects the diagram of the physical memory accommodated in the memory module 15 in FIG. 1.

The internal memory 20 has a memory sector 20a, in which the boot loader and the basic functions of the sensor IC 2 are permanently stored. A sector 20b is provided for the recording of the various configurations of parameters and applications from the auxiliary memory 21, and is called up for the processing of the normal operation after a successful configuration thereof.

The auxiliary memory 21 has an addressable memory area 21a, in which, according to this embodiment example, a configuration directory 21a is stored. This configuration directory addresses memory areas 21b, ..., 21h in association to various identifiers. By way of example, an identifier #1 can be allocated to the memory area of the memory addresses 500-8000 in accordance with the stored configuration directory. The address areas 8000-14500 are allocated to a memory area #2, the address areas 14500-21500 are allocated to a memory area #3, etc. These corresponding memory sectors are depicted in FIG. 2 schematically by the sectors 21b, 21c, ..., 21h. As a matter of course, more or fewer memory areas can also be implemented.

Each of the addressable memory areas contain data, which are necessary for the configuration of the sensor for the purpose of adjustment to a group of vehicles. By way of example, parameters are stored, which define the format of a data telegram that is to be transmitted from the sensor to the vehicle. Entire and adjusted program codes can also be stored.

With the processing of the instructions from the boot loader in the memory area 20a it is determined which configuration is to be called up from the auxiliary memory 21. This configuration identifier is transmitted from the exterior, e.g. by means of an LF communication device. A serial communication is subsequently established between the sensor IC 2 and the auxiliary memory 15, and the address area is looked up in the memory sector 21 that contains the data packet corresponding to the configuration identifier. This is the memory area 21d in the illustrated example. The contents of this memory area are subsequently copied into the memory area 20b via the serial interface.

For this, it is not necessary to transcribe the entire memory area 20b. Depending on which functions and data are already present in the internal memory, it is also possible to copy only specific parameters or program sections for an individual configuration.

After the necessary copying, the memory area 20b permanently contains the desired application, configured to the future use. In the normal operating mode, both the acquisition of the sensor values, in particular the tire pressure values, by means of the pressure tire sensor 4 in accordance with the configuration, as well as the transmission of the acquired data in accordance with the configuration data adjusted to the vehicle, can then occur. It is also entirely possible that the actual acquisition procedure occurs in accordance with the copied configuration. By way of example, the sensor can comprise the capability of detecting the acceleration in its hardware, but the measurement of the acceleration would only be acquired with some configurations. The sensor can, alternatively, acquire all data, whereas the transmission of the data is adjusted depending on the configuration, e.g. only a portion of the data is transmitted. In any case, the manner of transmission, thus, e.g. the structure of the data telegram for transmitting the data, can be adjusted to the vehicle.

The auxiliary memory 15 is deactivated in this example, after a successful communication. In this example, this means that the auxiliary memory 15 is no longer activated during normal operation, and thus the serial interface 13 is no longer used. A power supply to the auxiliary memory 15 can then also be entirely shut off in this embodiment example, in order to further reduce the power consumption.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed:

1. A tire pressure sensor for motor vehicles, comprising: a housing, an integrated circuit (sensor IC) accommodated in the housing, wherein the sensor IC has a microcontroller and a pressure sensor, and a wireless communication device is disposed in the housing, which is coupled to the microcontroller, in order to transmit pressure measurement values acquired by the pressure sensor to a separate receiver device, wherein the sensor IC has an internal memory in which executable instructions and data can be stored, which, when executed, result in the acquisition and transmission of the pressure measurement data, wherein a power supply is disposed in the housing, and is coupled to the sensor IC, characterized in that the sensor IC is coupled to an auxiliary memory module disposed in the housing, wherein numerous different data packets, having respective instructions or data, are stored in the memory module, wherein the auxiliary memory module can be activated by the microcontroller in order to copy a selected data packet into the internal memory, wherein the auxiliary memory module is coupled to the microcontroller of the sensor IC via a serial data interface.

2. The tire pressure sensor according to claim 1, wherein a single single-wire data line is formed between the sensor IC and the auxiliary memory module.

3. The tire pressure sensor according to claim 1, wherein the microcontroller controls the power supply for the auxiliary memory module such that the auxiliary memory can be switched over to an energy saving mode.

4. The tire pressure sensor according to claim 3, wherein the microcontroller then switches the auxiliary memory to the energy saving mode after a selected data packet has been copied from the auxiliary memory into the internal memory.

5. The tire pressure sensor according to claim 3, wherein the microcontroller is coupled to the means for wireless communication such that a selection of a data packet stored in the auxiliary memory occurs via the means for wireless communication, and the microcontroller subsequently copies the selected data packet from the auxiliary memory into the internal memory.

6. The tire pressure sensor according to claim 1, wherein the means for wireless communication have transmission means for high frequency signals and receiving means for low frequency signals.

7. The tire pressure sensor according to claim 1, wherein the auxiliary memory module is disposed, together with the sensor IC, on a printed circuit board, and is placed on the printed circuit board at a spacing to the sensor IC.

8. A method for operating a tire pressure sensor for motor vehicles, comprising the steps:
   wireless transmission of a selection identifier to the tire pressure sensor by means of a transmission device;
   operation of an auxiliary memory disposed in the tire pressure sensor with the aid of a sensor IC disposed in the tire pressure sensor, and requesting and transmission of a memory area corresponding to the selection identifier from the auxiliary memory into a smaller memory of a sensor IC via a serial interface between the sensor IC and the auxiliary memory.

9. The method according to claim 8, furthermore exhibiting:
   deactivation of the auxiliary memory after the copying procedure has occurred, wherein the auxiliary memory is separated from a power supply, or the power supply for the auxiliary memory is reduced.

10. The method according to claim 8, wherein the selection identifier is transmitted to an LF receiver device in the tire pressure sensor by means of an LF signal connection.

* * * * *